United States Patent
Gaillard

(10) Patent No.: US 12,508,658 B2
(45) Date of Patent: Dec. 30, 2025

(54) DEVICE FOR TRANSMITTING MOVEMENT

(71) Applicant: TECHNIC.COM, Paris (FR)

(72) Inventor: Jean-Christophe Gaillard, Paris (FR)

(73) Assignee: TECHNIC.COM, Paris (FR)

( * ) Notice: Subject to any disclaimer, the term of this patent is extended or adjusted under 35 U.S.C. 154(b) by 753 days.

(21) Appl. No.: 17/783,679

(22) PCT Filed: Dec. 10, 2020

(86) PCT No.: PCT/IB2020/061768
§ 371 (c)(1),
(2) Date: Jun. 9, 2022

(87) PCT Pub. No.: WO2021/116978
PCT Pub. Date: Jun. 17, 2021

(65) Prior Publication Data
US 2023/0001491 A1    Jan. 5, 2023

(30) Foreign Application Priority Data

Dec. 11, 2019  (FR) ..................................... 1914205

(51) Int. Cl.
*B23B 31/177*    (2006.01)
(52) U.S. Cl.
CPC .... *B23B 31/16233* (2013.01); *B23B 2270/58* (2013.01); *Y10T 279/1973* (2015.01)
(58) Field of Classification Search
CPC ........ B23B 31/16158; B23B 31/16233; B23B 2270/58; Y10T 279/1973
See application file for complete search history.

(56) References Cited

U.S. PATENT DOCUMENTS

| | | | | |
|---|---|---|---|---|
| 3,188,102 A | * | 6/1965 | Mott | ................... B23B 31/1207 |
| | | | | 279/123 |
| 4,198,067 A | * | 4/1980 | Steinberger | ....... B23B 31/16258 |
| | | | | 279/123 |
| 5,135,242 A | | 8/1992 | Toth | |

(Continued)

FOREIGN PATENT DOCUMENTS

| | | | |
|---|---|---|---|
| FR | 2 373 351 A1 | | 7/1978 |
| JP | H08229712 A | * | 9/1996 |

(Continued)

OTHER PUBLICATIONS

International Search Report for PCT/IB2020/061768 dated, Mar. 4, 2021 (PCT/ISA/210).

*Primary Examiner* — Eric A. Gates
(74) *Attorney, Agent, or Firm* — Sughrue Mion, PLLC

(57) ABSTRACT

A device for transmitting a movement between a first member and a second member, namely from a driving member to a driven member, of the type having a cylindrical journal with a circular base mounted so as to rotate in a recess of the driven member or of the driving member. At least one of the ends of this journal is hollowed out by a groove capable of forming, on either side thereof, two shoes that are symmetrical with respect to an axial and diametral plane of the journal and capable of engaging, by a flattened surface, with the driving member or the driven member, the cross-section of each shoe being delimited by an arc of a circle matching the external surface of the journal, ending in a line segment that is part of the flattened surface.

7 Claims, 10 Drawing Sheets

(56) References Cited

Figure 1:
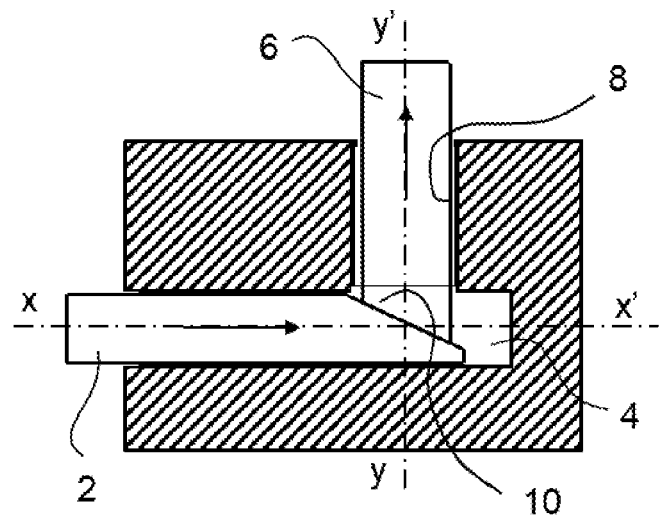

U.S. PATENT DOCUMENTS 5,174,179 A    12/1992  Hiestand
7,311,312 B2 * 12/2007  Nishimiya ........ B23B 31/16266
                                                    279/123

FOREIGN PATENT DOCUMENTS

JP        2011-251347 A    12/2011
JP        2013-255967 A    12/2013

* cited by examiner

DEVICE FOR TRANSMITTING MOVEMENT

CROSS REFERENCE TO RELATED APPLICATIONS

This application is a National Stage of International Application No. PCT/IB2020/061768 filed Dec. 10, 2020, claiming priority based on French Patent Application No. 1914205 filed Dec. 11, 2019.

This invention relates to a device for transmitting a linear movement between a driving member and a driven member during which the direction of this movement is changed, this device being particularly interesting when the forces to be transmitted are significant, as well as, for example, in chuck and return cam applications, in press tools, in brake shoes or bevel gear punch heads. It is known that in some mechanical systems the transmission of motion between two moving members in translation that are guided linearly, namely a driving member and a driven member that have different orientations, is carried out via a sloped ramp. Such a ramp consists of two surfaces of these members that rub against each other. Such a system can thus be of the "double-acting" type when it comprises a two-sided ramp that enables a "push-pull" transmission of the movement or of the "single-acting" type when it concerns a one-sided ramp that enables transmission of the movement by pushing.

When built with good precision, such systems can work without major problems. This is not the case if they are misaligned, for example due to wear or if they have a faulty angle, for example due to machining tolerances that are too broad.

Such flaws have the disadvantage of generating a concentration of forces on the edges at the end of the ramp and, on the other hand, of causing these edges to scrape off the film intended to ensure the lubrication of the device.

Such a situation itself leads to a drop in the conversion efficiency of the movement or even to the system bending and subsequently jamming, which in the long run, due to abrasion, causes premature wear of the surfaces in contact, which in time can lead to their degradation and seizure. To avoid such drawbacks, it has been proposed to match the angles of the contacting surfaces of the driving member and the driven member using cylindrical shoes that are mounted so as to oscillate in a recess built into one of said members. In such a system, the cylindrical shoe contacts with the ramp via a flattened surface built into the latter, so that it can rotate such that this flattened surface comes in permanent contact with that ramp.

However, it was found that during the movement, due to the friction of the ramp on the flattened surface of the shoe, the latter tended to rotate in the direction of the sliding, such that its leading or following edge is facing the lubricant and scraping it off, thus preventing any lubrication. U.S. Pat. No. 5,135,242 describes a chuck with radial clamping jaws, in which the actuating movement is performed by a driving member that acts along the axis of the chuck. In such a chuck, a cylindrical journal is used which is rotatably mounted in a driven member and each end of which is machined to form a stud comprising two opposite flattened surfaces relative to the axis of the journal. Each of the studs slides into a groove in the driving member, the axis of that groove being sloped relative to the axis of the driving member. Under these conditions, when the driving member moves axially, the flattened surfaces of the stud are respectively applied against one edge or the other of the groove according to the direction of axial displacement of the driving member. This results in a radial displacement of the driven member in either direction, following the direction of axial displacement of the driving member.

Such a system presents the aforementioned drawback, namely that the stud is led to rotate in the direction of the sliding, such that its leading or following edge is facing the lubricant and scraping it off, thus preventing any lubrication.

This invention proposes to remedy the aforementioned drawbacks by proposing means to make contact between the driven member and the driving member that allows optimal lubrication of the system.

This invention therefore aims to provide a device for transmitting a movement between a first and a second member, i.e., from a driving member to a driven member, of the type comprising a cylindrical journal with a circular base rotatably mounted in a housing of the driven member or of the driving member, at least one of the ends of this journal being hollowed out by a groove capable of forming on either side thereof two symmetrical shoes with respect to an axial and diametral plane of the journal and capable of coining into contact with the driven member or the driving member via a flattened surface, the straight section of each shoe being delimited by an arc conforming to the outer surface of the journal, ending with a straight segment belonging to the flattened surface.

Preferentially, the journal will be rotatably mounted in the housing of the driven member, which usually corresponds to a shorter kinematic length.

According to the invention, the driving member may comprise a ramp against the sides of which the flattened surfaces of the shoes can be applied.

The sides of this ramp may be symmetrical with respect to a plane. They may also be parallel to this plane. These sides may also form an angle with said plane comprised between 5° and 30° and preferentially, on the order of 15°.

The device according to the invention may comprise at least one pair of ramps; between each of these pairs of ramps there may be a journal that is rotatably mounted in a housing of the driven member, each of the two ends of this journal forming a pair of shoes whose flattened surfaces can be applied respectively against the sides of the ramps.

The ramps of each pair of ramps can be arranged opposite each other. These ramps may be attached to a slide mounted on a plate that can be moved in translation along the axis of a chuck under the action of a control member.

The driven member can consist of a jaw holder of a concentric clamping chuck.

The chuck jaw holder can be mounted so as to slide into a radial slide on the chuck.

This invention also relates to a radial clamping chuck with several concentric jaws, in which the radial displacement of the jaws is controlled by an axial displacement of a control member, the transmission of the movement of the control member to the jaws being performed by means of a device for transmitting a movement as described above.

Figure 2:
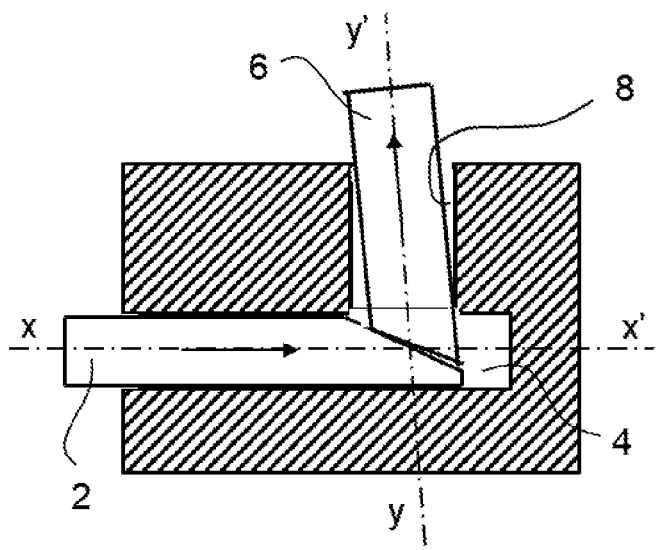
Figure 3:
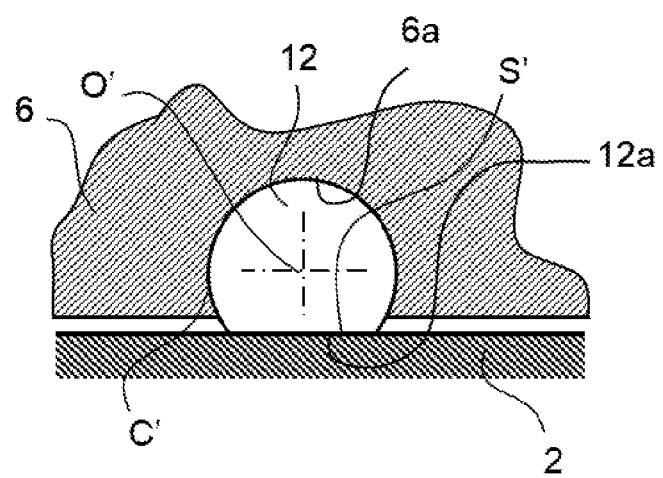
Figure 4:
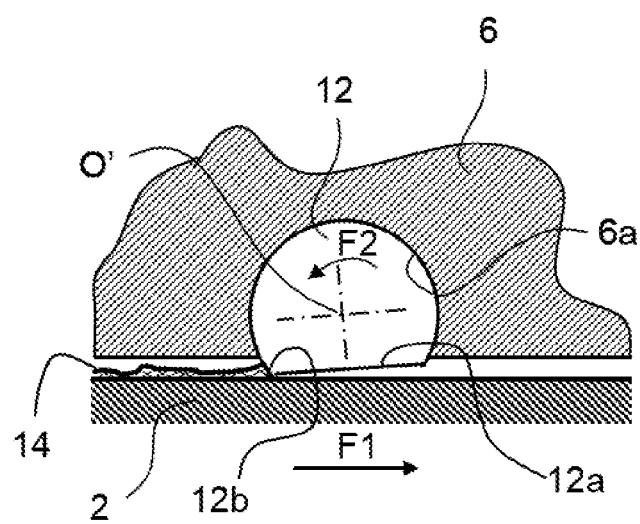
Figure 5:
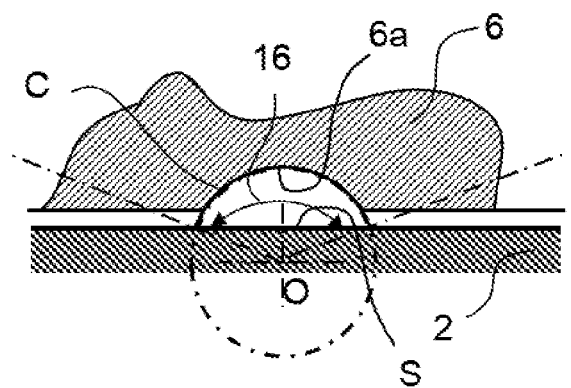
Figure 6:
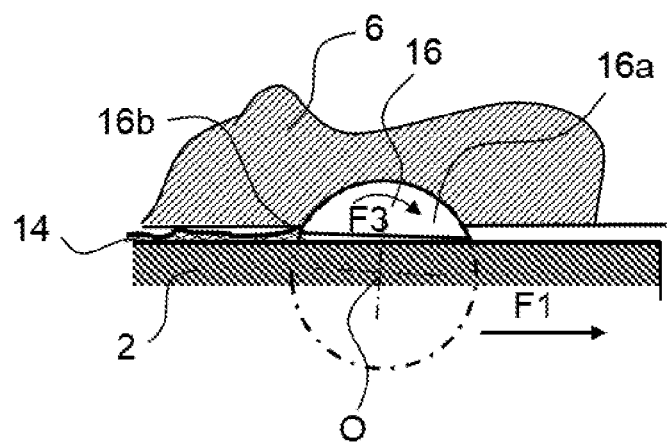
Figure 7:
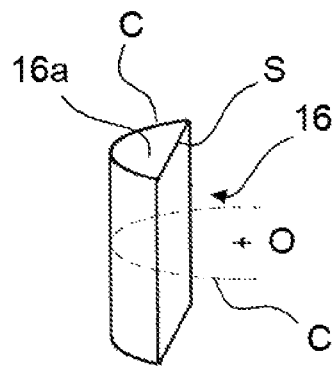
Figure 8:
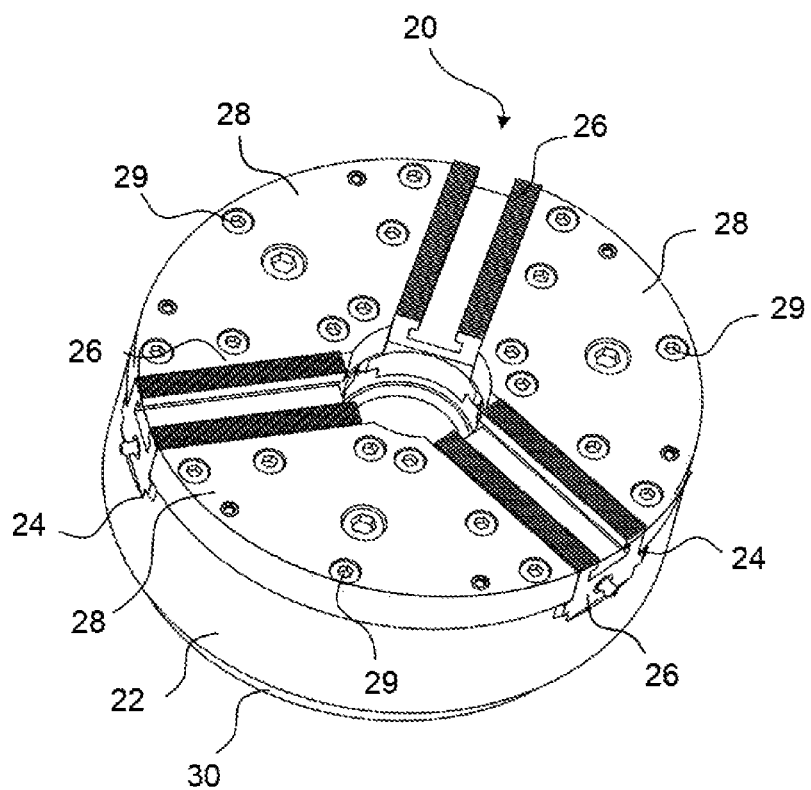
Figure 9:
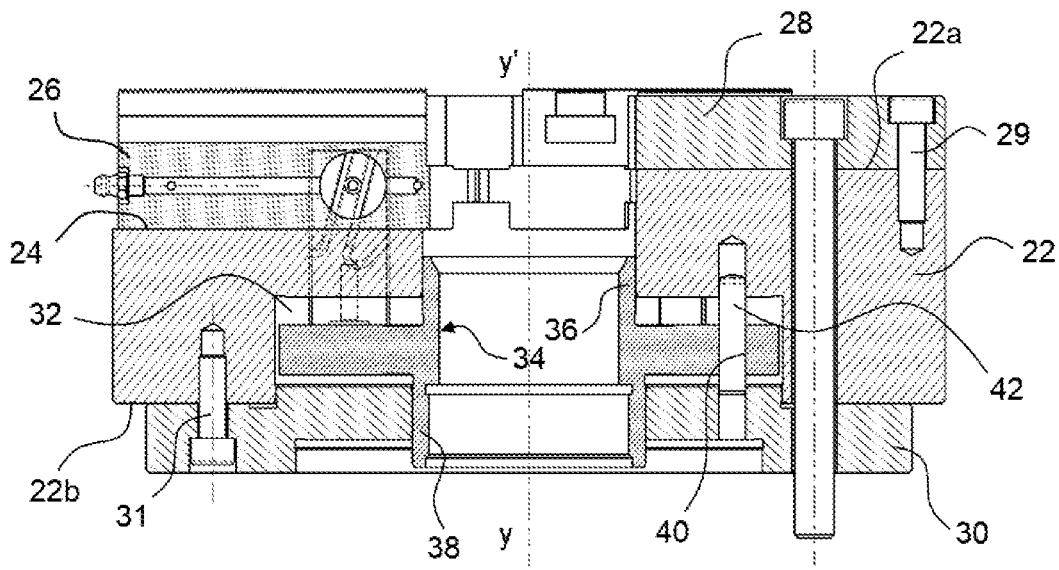
Figure 10:
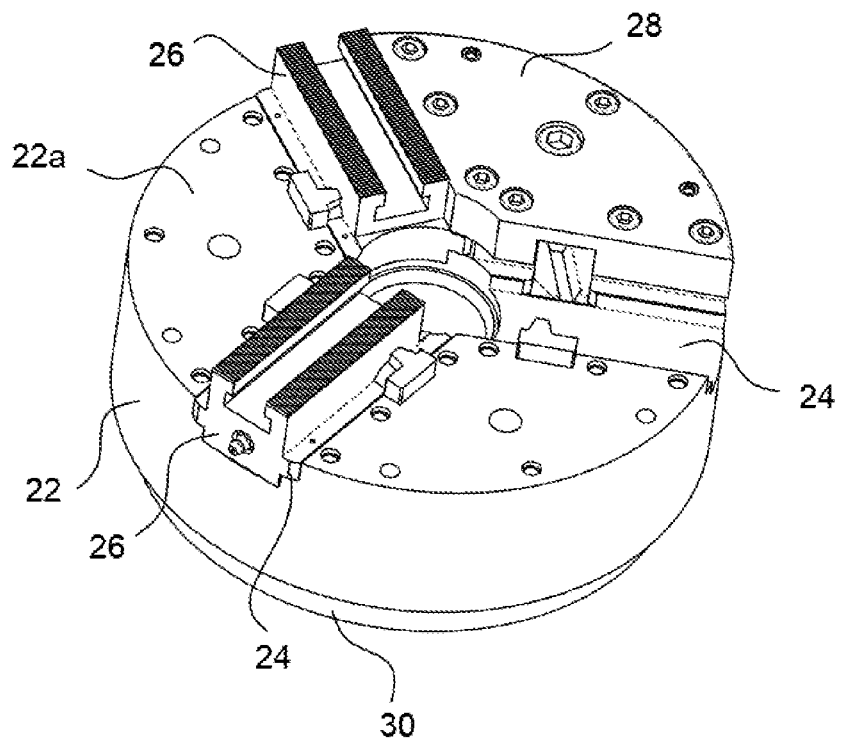
Figure 11:
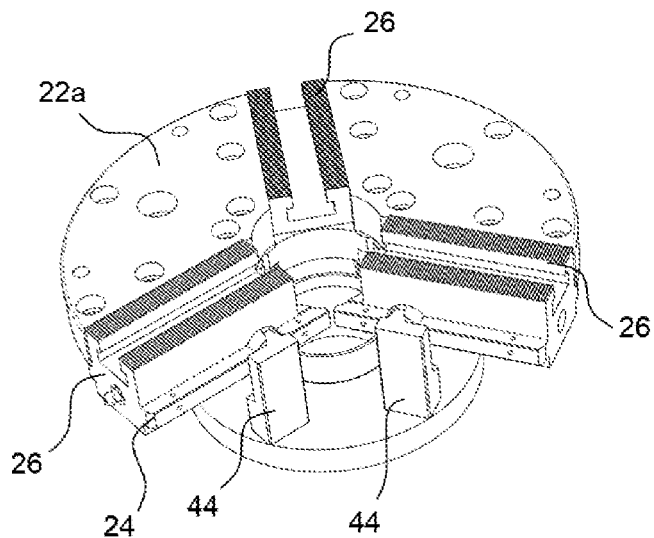
Figure 12:
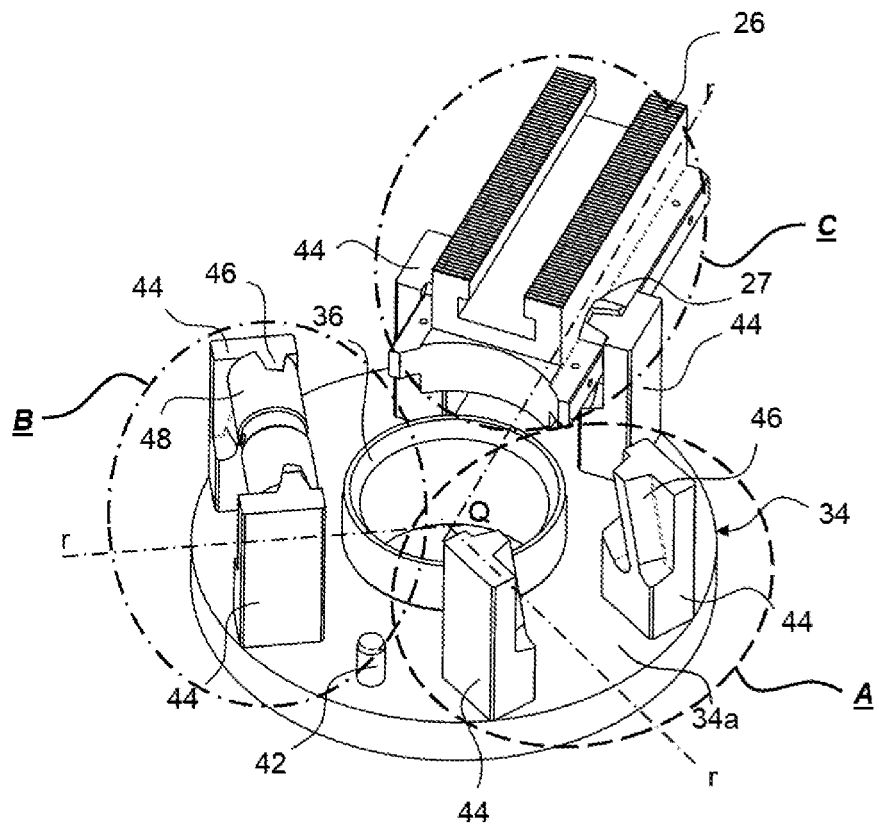
Figure 13:
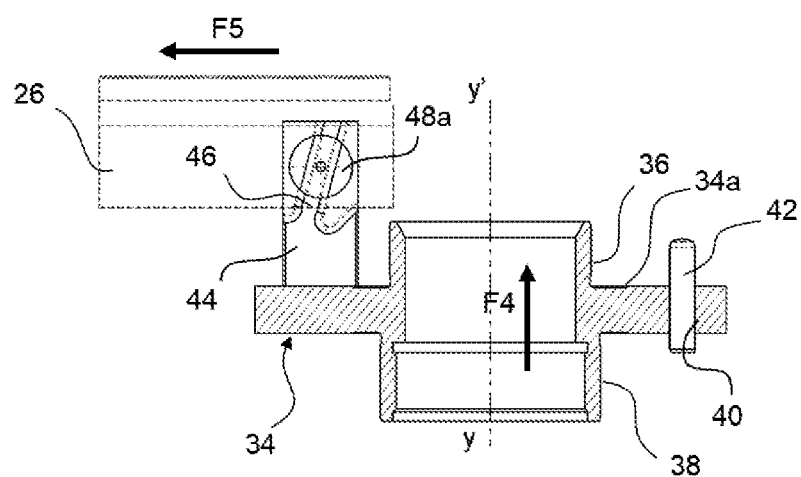
Figure 14:
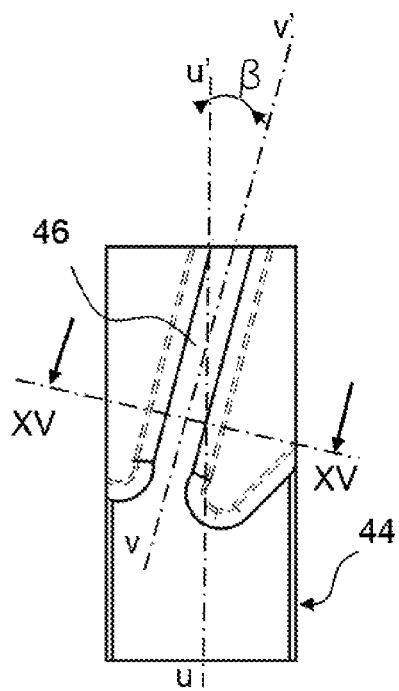
Figure 15:
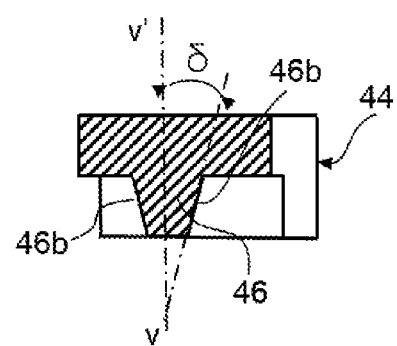
Figure 16A:
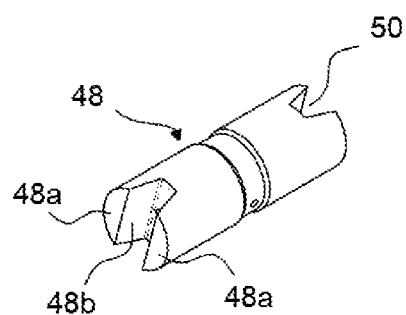
Figure 16B:
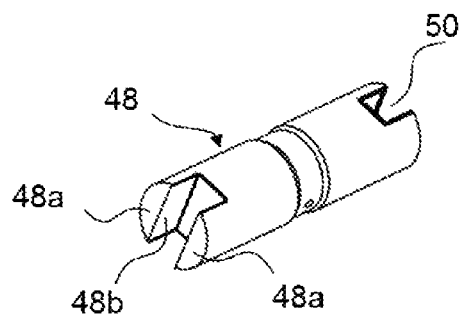
Figure 17:
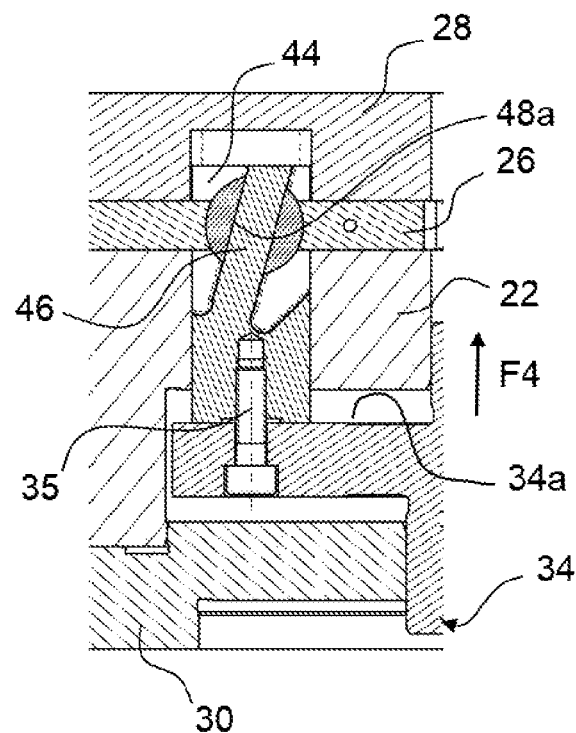
Figure 18:
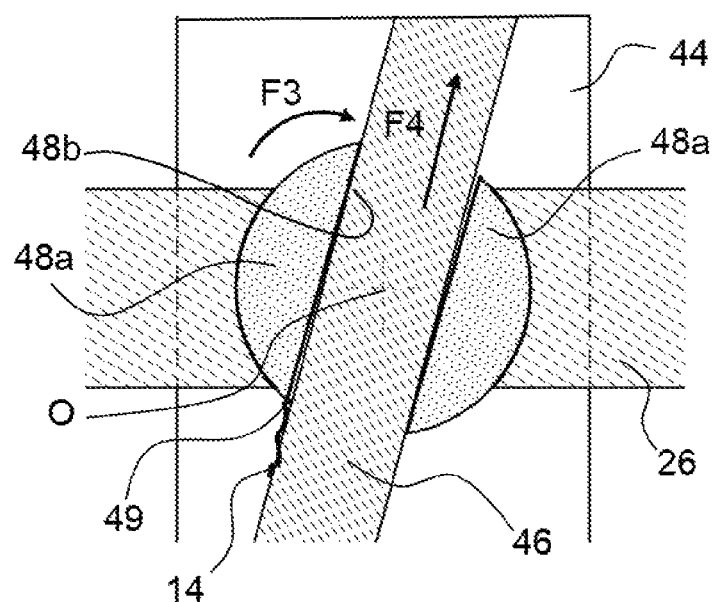
Figure 19:
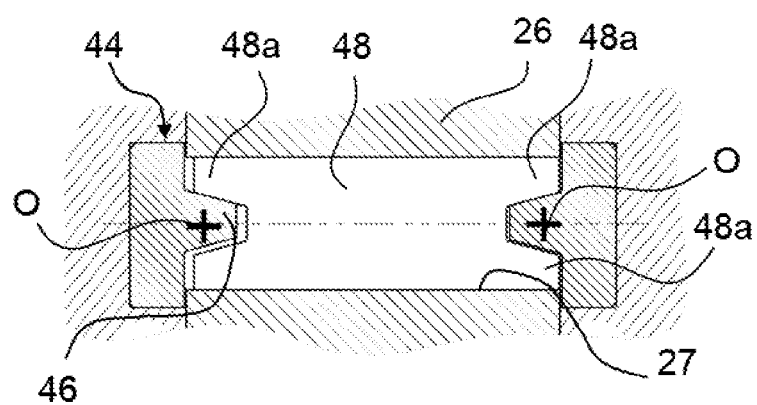

By way of non-limiting example, the embodiments of this invention will be described below with reference to the appended drawing in which:

FIG. 1 is a schematic drawing representing, according to the prior art, the principle of the transmission of a movement from a driving member to a driven member perpendicular to the driving member, FIG. 2 is a schematic drawing based on FIG. 1, illustrating a blockage of the transmission of a movement by jamming, FIG. 3 is a schematic drawing representing, according to the prior art, a method of using a transmission of movement from a driving member to a driven member perpendicular to the driving member by way of an oscillating shoe, FIG. 4 is a schematic drawing based on FIG. 3, illustrating the rotation of an oscillating shoe during the transmission of a movement, FIG. 5 is a schematic drawing representing a method of using a transmission of movement from a driving member to a driven member perpendicular to the driving member by way of an oscillating shoe according to this invention, FIG. 6 is a schematic drawing based on FIG. 5, illustrating the rotation of an oscillating shoe according to the invention during the transmission of a movement, FIG. 7 is a perspective view of an example of an oscillating shoe according to the invention, FIG. 8 is a perspective view of a concentric clamping chuck, shown without its jaws, FIG. 9 is a diametrical cross-section view of the chuck shown in FIG. 8, FIG. 10 is a perspective view of the chuck shown in FIG. 8, when its upper plates and one of its jaw holders are removed, FIG. 11 is a perspective view of the control plate of a chuck showing the connection between the slides of the chuck and the jaw holders, FIG. 12 is a perspective view showing the top of the chuck control plate and, respectively: two slides, two slides equipped with journals and two slides equipped with journals controlling a jaw holder, FIG. 13 is a diametrical cross-section view of a control plate used in the chuck, FIG. 14 is a front view of a slide used in the chuck, FIG. 15 is a transverse cross-section view of the slide shown in FIG. 14 following line XV-XV thereof, FIG. 16a is a perspective view of a journal used in the chuck, FIG. 16b is a variant of an embodiment of the journal shown in FIG. 16a, FIG. 17 is a partial cross-section view of the chuck, FIG. 18 is an enlarged partial view of FIG. 17, FIG. 19 is a schematic cross-section view of a journal mounted between two slides.

FIGS. 1 and 2 show a diagram showing the known general principle of the transmission of motion from a driving member 2, slidingly mounted in a bore 4 of axis xx', and a driven member 6, slidingly mounted in a bore 8 of axis yy', perpendicular to the previous one. To do so, a sloped ramp 10 built into the driving member 2 is used; the end of the driven member 6 in contact with the latter must then have an angle allowing it to apply perfectly to this ramp 10.

A known drawback to this type of movement transmission is that, as specified above, the driven member 6 tends to bend as shown in FIG. 2, in particular when slack is created in the system and in particular in bore 8, due, for example, to wear or a lack of adjustment of the members on the ramp 10. The consequences of such a situation have been mentioned previously.

In order to avoid this drawback, it has been proposed, on the one hand, to ensure proper lubrication of the system and, on the other hand, to provide means to ensure good contact of the driving member and the driven member, aimed at addressing problems related to wear or machining flaws.

It is thus proposed to have an oscillating shoe in one of the two moving members, and in particular in the driven member, A schematic representation has been shown in FIG. 3 of such a cylindrical oscillating shoe 12, which is arranged in a housing 6a of the driven member 6. Starting, from a cylinder with a circular base, it was machined in such a way as to form a flattened surface or contact face 12a plane parallel to the longitudinal axis of this cylinder, and it is this face 12a, which comes into contact with the driving member 2, The straight section of the cylinder forming the shoe 12 is thus comprised of an arc C' which is closed by a straight segment S', the center O' of the arc C', which also constitutes the center of rotation of the shoe, being arranged inside the straight section thereof.

Under these conditions, and as shown in FIG. 4, it can be seen that when moving the driving member 2 in the direction of the arrow F1, the oscillating shoe 12 will rotate in the direction of the arrow F2 around its center of rotation O', which has the effect of bringing its following or leading edge 12b in contact with the surface of the driving member 2 and scrape it, this scraping preventing the lubricating fluid 14, which arrives in the displacement direction F1, from reaching the members to be lubricated.

This invention aims to remedy this drawback by proposing a new motion transmission system comprising a journal comprising two oscillating shoes, which, during the displacement, tend to rotate in the opposite direction from the oscillating shoes in the prior art, and therefore do not prevent lubrication.

Schematic FIG. 5 shows a device for transmitting a movement in which the driven member 6 receives a cylindrical shoe 16. This cylindrical shoe, which is shown in perspective in FIG. 7, is such that its straight section 16a is formed of an arc C that is closed by a straight segment S. However, unlike the previous shoe, the center O of this circular arc C is arranged so as to be outside this straight section 16a.

It will be seen that, under these conditions and as shown in FIG. 6, when the driving member 2 moves in the direction of the arrow F1, it rotates the shoe 16 which, as in this case its center of rotation O is offset to the outside of the latter, then rotates in the direction of the arrow F3, such that its following or leading edge 16b lifts and thus clears the contact surface with the driving member 2, allowing the lubrication flow 14 to be admitted to the system and to lubricate the system.

The following describes a first example of the use of the device for transmitting movement according to the invention, applied to the control of the movement of the jaws of a chuck. FIGS. 8 to 13 show a concentric three-jaw clamping chuck 20 with radial clamping. This chuck essentially comprises a cylindrical chuck body 22 whose front face 22a is hollowed out of three rails 24 arranged at 120° in which three jaw holders 26 are slidingly mounted. These three jaw holders 26 are held on the body 22 by three plates 28 which are screwed into the body 22 by screws 29. The posterior face 22b of the body 22 is closed by a circular bottom plate 30 which is attached therein by screws 31.

The interior of the body 22 is hollowed out of a cylindrical cavity 32 that is open on the side of its posterior face 22b, which receives a circular plate 34 fitted, on its anterior and posterior portions, with respective tubular bosses 36 and 38. The plate 34 has actuating means, not shown in the drawing, making it possible to move the plate along the axis yy' of the chuck. To this end, the anterior and posterior bosses 36 and 38 are slidingly mounted, respectively, in housings provided in the body 22 and in the bottom plate 30. Furthermore, the plate 34 is drilled by a hole 40 that receives a centering rod 42 ensuring correct angular positioning thereof with respect to the body 22.

A drawing of the top of the plate 34 is shown in FIG. 12, which is separated into three zones marked A, B and C which correspond respectively to three successive steps of the assembly.

Thus, zone A represents the anterior face 34a of the plate 34 which comprises three pairs of slides 44, represented in detail in FIG. 14, whose longitudinal axes uu' are perpendicular to the anterior face 34a of the plate 34. As shown in FIG. 17, these slides 44 are attached to the plate 34 by means of screws 35 that pass through the plate. The slides of each pair are arranged facing each other, i.e., they are arranged symmetrically with respect to a radial plane perpendicular to the anterior face 34a of the plate, so that the three radial planes of the chuck are thus distributed according to radii Q offset from each other by 120°, as shown in FIG. 12.

The faces vis-à-vis each slide 44 are machined in such a way as to form a central male ramp 46 whose median plane vv' is sloped relative to the axis uu' of the slide by an angle β preferably comprised between 5° and 45° and preferentially 15°, as shown in FIG. 14. The sides 46b of this ramp are symmetrical with respect to the plane vv'.

In the straight section, following the XV-XV line in FIG. 14, the ramp 46, as shown in FIG. 15, has an isosceles trapezoid shape, the small base of which is on the outside and the angle formed by each of its sides 46b with the median plane vv' forms a side angle δ, which is small in order to avoid generating lateral thrusts. Preferentially, this side angle δ will be comprised between 5° and 30° and in particular equal to 15°.

As shown in zone B of FIG. 12, between each of the three pairs of slides 44, there is a cylindrical journal 48 with a circular base, represented in FIG. 16a, the ends of which are hollowed out by a groove 50, the shape of which is complementary to that of the ramp 46 and thus forms a fork whose branches form shoes 48a whose sides 48b support the sides 46b of the ramp 46, by of course providing for a working clearance.

According to the invention, and unlike the devices of the prior art, the two opposite oscillating shoes formed by the branches 48a of the journal 48 have their center of rotation O outside their straight section, and more specifically in the present embodiment, on the longitudinal axis of each journal, as shown in FIG. 18. These two journals thus have the same operating mode as the one described above in relation to FIGS. 5 and 6, such that they allow for correct admission of the lubricating fluid 14 between the moving parts.

The δ slope of the sides 46b of the ramp 46 relative to its median plane vv', as shown in FIGS. 15 and 19, and the corresponding inclination of the sides 48b of the shoes 48a are interesting in that they create corner bearing means, which make it possible to compensate for any production flaws. More specifically, such an arrangement has the advantage of allowing the oscillating shoe, by moving transversely in its housing, to compensate for possible flaws in the positioning of the contact surfaces, as shown in FIG. 19. Thus, despite an offset of the ramps, they cooperate on the sides of the journal.

Of course, according to the invention, the sides 46b of the ramp 46 as well as the sides 48b of the shoes 48a may not be sloped as shown in FIG. 16b, and each shoe would thus have the shape of a cylinder whose base would consist of an arc ending in a segment, as shown in FIG. 7, which would have the advantage of offering better mechanical efficiency and being easier to achieve. As shown in zone C of FIG. 12, the jaw holder 26 is hollowed out of a housing 27 transverse to it, the diameter of which allows the journal 48 to slide into it.

Under these conditions, and referring in particular to FIG. 13, it can be seen that when the plate 34 is actuated by an axial translation movement with respect to the jaw holder 26, for example in the direction of the arrow F4, the axial displacement of the slide 44, and therefore its ramp 46, with respect to the jaw holder 26, has the effect of generating a radial displacement of the latter following the arrow F5. The movement of a driving member, consisting of the slide 44 and its ramp 46, is thus transmitted to a driven member, consisting of the jaw holder 26, these two members having perpendicular directions.

According to the invention, as illustrated in schematic FIGS. 13 and 18, when the plate 34 moves in the direction of the arrow F4, the slide 44 and its ramp 46, which in this case constitutes the driving member, the journal 48, as a result of this displacement, tends to rotate in the direction of the arrow F3, which has the effect of clearing the heel 49 of their contact face 48b with the sides of the ramp 46, thus allowing the admission of the lubricating fluid 14 between these two elements.

This invention is of interest for many mechanical devices and in particular those that require the transmission of a significant force between a driving part and a driven part with sloping axes and especially perpendicular axes, in particular in the actuation of press slides, for example punch presses.

Previous embodiments have been described in which the oscillating shoe or shoes was/were rotatably embedded in a driven part, but, of course, according to the invention, this could be inversely achieved.

Lastly, and although a clevis-mounted journal has been described above, this invention is of course applicable to a journal that is cantilever-mounted. Furthermore, the slides can be prismatically guided, as described above, which has the advantage of not having to be locked in rotation, or cylindrically guided, which makes them easier to achieve.

Of course, these examples are in no way limiting relative to the multiple applications of this invention.

The invention claimed is:

1. A device for transmitting a movement from a driving member to a driven member, the device comprising a cylindrical journal with a circular base rotatably mounted in a housing of the driven member or of the driving member, wherein at least one of the ends of the journal is hollowed out by a groove capable of forming on either side thereof two symmetrical shoes with respect to an axial and diametral plane of the journal and capable of coming into contact with the driven member or the driving member via a flattened surface, the straight section of each shoe being delimited by an arc conforming to the outer surface of the journal, ending with a straight segment belonging to the flattened surface,
wherein the driving member comprises a ramp against sides of which the flattened surfaces of the shoes are capable of being applied,
wherein the sides of the ramp are symmetrical with respect to a plane, and
wherein the sides of the ramp form with said plane an angle comprised between 5° and 30°.

2. The device for transmitting a movement according to claim 1, wherein the journal is rotatably mounted in the housing of the driven member.

3. The device for transmitting a movement according to claim 1, wherein the sides of the ramp are parallel to said plane.

4. The device for transmitting a movement according to claim 1, wherein the driven member comprises a jaw holder of a concentric clamping chuck.

5. A radial clamping chuck with several concentric jaws, in which the radial displacement of the jaws is controlled by an axial displacement of a control member, wherein the transmission of the movement of the control member to the jaws is performed by the device for transmitting a movement according to claim 1 above.

6. A device for transmitting a movement from a driving member to a driven member, the device comprising a cylindrical journal with a circular base rotatably mounted in a housing of the driven member or of the driving member, wherein at least one of the ends of the journal is hollowed out by a groove capable of forming on either side thereof two symmetrical shoes with respect to an axial and diametral plane of the journal and capable of coming into contact with the driven member or the driving member via a flattened surface, the straight section of each shoe being delimited by an arc conforming to the outer surface of the journal, ending with a straight segment belonging to the flattened surface,
- wherein the journal is rotatably mounted in the housing of the driven member, and
- wherein the driving member comprises at least one pair of ramps arranged facing each other; between each of the pairs of ramps is arranged the journal rotatably mounted in the housing of the driven member, each of the two ends of this journal forming the pair of shoes whose flattened surfaces are respectively applied against sides of the ramps.

7. The device for transmitting a movement according to claim 6, wherein that the ramps are attached to a slide mounted on a plate that can be moved in translation along the axis of a chuck under the action of a control member.

* * * * *